(12) United States Patent
Collins

(10) Patent No.: US 7,635,247 B2
(45) Date of Patent: Dec. 22, 2009

(54) TELESCOPING VEHICLE STEP

(76) Inventor: Douglas A. Collins, 604 E. Brickley, Hazel Park, MI (US) 48130

( * ) Notice: Subject to any disclaimer, the term of this patent is extended or adjusted under 35 U.S.C. 154(b) by 562 days.

(21) Appl. No.: 11/049,467

(22) Filed: Feb. 2, 2005

(65) Prior Publication Data

US 2006/0170180 A1 Aug. 3, 2006

(51) Int. Cl.
*B60P 9/00* (2006.01)
(52) U.S. Cl. ....................................... 414/462
(58) Field of Classification Search ............... 414/462; 280/163, 166
See application file for complete search history.

(56) References Cited

U.S. PATENT DOCUMENTS

| | | | | |
|---|---|---|---|---|
| 4,991,865 A | * | 2/1991 | Francisco | 280/477 |
| 5,011,176 A | * | 4/1991 | Eppinette | 280/479.3 |
| 5,570,826 A | * | 11/1996 | Garbes et al. | 224/524 |
| 5,695,204 A | * | 12/1997 | Ford | 280/507 |
| 5,727,805 A | * | 3/1998 | La Roque | 280/478.1 |
| 5,788,311 A | | 8/1998 | Tibbals | |
| 6,186,729 B1 | * | 2/2001 | Sargent | 414/462 |
| 6,237,927 B1 | * | 5/2001 | Debo | 280/166 |
| 6,357,780 B1 | * | 3/2002 | Young | 280/506 |
| 6,402,181 B1 | * | 6/2002 | Lee | 280/507 |
| 6,422,630 B1 | | 7/2002 | Heaviside | |
| 6,474,668 B2 | | 11/2002 | Debo | |
| 6,491,315 B2 | * | 12/2002 | Hagen et al. | 280/164.1 |
| 6,685,204 B1 | * | 2/2004 | Hehr | 280/166 |
| 2001/0045720 A1 | * | 11/2001 | Schlicht | 280/166 |
| 2002/0073746 A1 | * | 6/2002 | Wyers | 70/34 |
| 2003/0116938 A1 | * | 6/2003 | Shields et al. | 280/166 |

* cited by examiner

*Primary Examiner*—Saúl J Rodriguez
*Assistant Examiner*—Joshua I Rudawitz
(74) *Attorney, Agent, or Firm*—Gregory T. Zalecki

(57) ABSTRACT

A telescoping vehicle step comprised of three slide beams and a step. The first slide beam is shaped to slide within the hitch receiver of a vehicle. The second slide beam is inserted into the first slide beam. The third slide beam is inserted into the second slide beam. A step is attached to the third slide beam. The slide beams and step form a telescoping vehicle step which can be used to facilitate entry into the cargo bed of a vehicle. During use, the beams form a telescopic extension member which positions the step beyond the outer perimeter of a lowered tailgate. When not being used, the beams form a collapsed configuration which holds the step near the opening of the hitch receiver.

6 Claims, 7 Drawing Sheets

TELESCOPING VEHICLE STEP

BACKGROUND

Many motor vehicles have cargo beds. Pickup trucks are typical of such vehicles. A pickup truck has a tailgate which pivots between an open and a closed position. The tailgate serves as a door to the cargo bed. The purpose of the cargo bed is to facilitate the transportation of cargo. Therefore, a person often needs to stand within the cargo bed of the vehicle or upon a lowered tailgate in order to assist the loading, unloading and positioning of cargo.

Many vehicles are high enough off of the ground that a person cannot get into the cargo bed or onto the lowered liftgate without strenuous athletic movements. A makeshift step is often used to provide an intermediate landing for a person's feet before the person takes a second step into the vehicle. This procedure is fraught with problems. Often a step is not available. At other times a part of the intended cargo is used as a makeshift step. Such a makeshift step often has incorrect dimensions, is unstable or subjects cargo used as a step to damage.

Most pickup trucks are equipped with hitch receivers. They are either equipped with hitch receivers at the time of manufacture or a hitch receiver is added to the vehicle after manufacture. The purpose of the hitch receivers is to receive, retain and secure a trailer hitch to the vehicle. Typical hitch receivers are attached substantially parallel to the longitudinal axis of the vehicle. They have a rectangular opening for receiving a trailer hitch. They have a pair of aligned openings for receiving the locking members of a hitch lock.

What is needed is a telescoping vehicle step with the following features. It would fit within and slide within the hitch receiver of the vehicle. When not needed, it could be securely collapsed adjacent to the opening of the hitch receiver. When needed, it could be extended by pulling from the hitch receiver such that the step extends beyond the lowered tailgate of the vehicle. It would provide a step for a person to step upon and easily climb into the cargo bed or onto the lowered tailgate of the vehicle.

SUMMARY

The telescoping vehicle step satisfies these needs. The telescoping vehicle step is intended to be inserted into a hitch receiver. The hitch receiver is attached substantially parallel to the longitudinal axis of a vehicle. It has a polygonal opening. Typically, the opening is square. The hitch receiver is intended to receive and securely retain a trailer hitch. The hitch receiver has a pair of aligned openings. The aligned openings are intended to receive the locking cylinder of a hitch lock.

A telescoping vehicle step is comprised of a first slide beam, one or more secondary slide beams having insertion ends, means for preventing the insertion end of each secondary slide beam from being withdrawn from the slide beam into which it is inserted and a step.

The first slide beam is shaped as a hollow polygon. It has a beam receiving end and means for limiting the slide displacement of the first slide beam within the hitch receiver. The first slide beam is shaped and sized to slide within, but not rotate within, the hitch receiver. Each secondary slide beam has an insertion end and a receiving end. Each secondary slide beam is shaped and sized to slide within, but not rotate within, the receiving end of a slide beam. The insertion end of each secondary slide beam is inserted into the receiving end of an adjacent slide beam. The hollow polygonal first slide beam and the one or more polygonal secondary slide beams form a telescoping non rotating beam. A step is attached to the receiving end of the secondary slide beam most distal to the first slide beam.

In order to prevent the slide beams from separating from each other when they are extended, means for preventing the insertion end of each secondary slide beam from being withdrawn from the slide beam into which it has been inserted are necessary. The preferred means is comprised of longitudinally aligned slots on the upper faces of each slide beam, except the slide beam most distal to the hitch receiver, limit pin openings on the upper face near the insertion end of each secondary slide beam and a limit pin for each secondary slide beam. The term upper face of a slide beam refers to the uppermost horizontal face of the beam when the first slide beam is inserted into the hitch receiver. The limit pin opening of a secondary slide beam having a longitudinally aligned slot is positioned between the slot and the insertion end of the beam. The limit pin opening of the secondary slide beam most distal to the hitch receiver is positioned on the upper face of the beam proximal to the insertion end of the beam.

One secondary slide beam is inserted into the first slide beam such that the limit pin opening of the secondary slide beam is positioned within the longitudinally aligned slot of the first slide beam. The secondary slide beam is secured to the first slide beam by a limit pin which is inserted through the longitudinally aligned slot of the first slide beam and the limit pin opening of the secondary slide beam, thereby forming a telescoping beam which will not separate upon extension. Likewise, the insertion end of each additional secondary slide beam is inserted into the receiving end of an adjacent secondary slide beam such that the limit pin opening of the additional secondary slide beam is positioned within the longitudinally aligned slot of the adjacent secondary slide beam. Each additional secondary slide beam is secured to its adjacent secondary slide beam by a limit pin which is inserted through the longitudinally aligned slot of the adjacent secondary slide beam and the limit pin opening of the additional secondary slide beam, thereby forming a telescoping beam which will not separate upon extension.

One means for limiting the slide displacement of the first slide beam within the hitch receiver is comprised of a pair of aligned openings within the first slide beam and a spring-loaded pair of aligned locking bosses. The term a pair of aligned openings within the first slide beam refers to a pair of aligned openings positioned upon the same face of the first slide beam.

Each of the openings is sized, shaped and positioned upon the first slide beam such that the opening may be aligned with an opening within the hitch receiver when the first slide beam is inserted into the hitch receiver. Each vertical face of the first slide beam has two openings. The term vertical face of the first slide beam refers to the vertically oriented faces of the first slide beam when it is inserted into the hitch receiver. The openings on the vertical face of the first slide beam are sized, shaped and positioned such that an opening upon each vertical face of the first slide beam is simultaneously alignable with the openings within the hitch receiver. Each pair of aligned openings positioned within the same vertical face of the first slide beam has chamfered facing edges. The first slide beam is secured to the hitch receiver with a spring-loaded pair of aligned locking bosses. The locking bosses are sized, shaped and positioned upon a spring-loaded bracket such that the locking bosses will protrude through the openings of the hitch receiver and into an opening within the first slide beam on each vertical face of the first slide beam, thereby limiting movement of the first slide beam along the longitudinal axis of the hitch receiver in the direction of the other chamfered opening upon the same vertical face of the first slide beam and preventing movement of the first slide beam along the longitudinal axis of the hitch receiver in the direction opposite the chamfers. Thus, each pair of aligned openings upon the same vertical face of the first slide beam forms a two position detent with the spring-loaded pair of aligned locking bosses.

The preferred means for limiting the slide displacement of the first slide beam within the hitch receiver is comprised of two channels positioned upon the first slide beam and a modified hitch lock. Each channel is longitudinally aligned along a vertical face of the first slide beam. The hitch lock has two aligned spaced apart locking bosses. The locking bosses are spaced apart such that they protrude through the aligned openings of the hitch receiver and into the aligned channels of the first slide beam. The channels are sized, shaped and positioned such that the locking bosses of the hitch lock inserted into the openings of the hitch receiver protrude into the channels. The locking bosses slidingly retain the first slide beam within the hitch receiver and secure the first slide beam to the hitch receiver when the hitch lock is locked.

Preferably, the receiving end of each beam and the receiving end of the hitch receiver have reinforcing collars. This strengthens the telescoping beam assembly and reduces the possibility of deformation of the beams. Additionally, a reinforcing collar upon the receiving end of the hitch receiver provides a base to which a step lock may be secured. A step lock is desirable in order to prevent the telescoping vehicle step from extending and telescoping when it is not being used. The step lock is attached to the assembly of the step and its attached slide beam. Preferably, it is comprised of a bracket and a lock flap. The lock flap is fabricated from a stiff elastic material such as plastic. The bracket is sized, shaped and positioned such that the lock flap will prevent undesired telescoping or extension of the device by creating a physical stop with the reinforcing collar on the hitch receiver.

Preferably, the polygonal opening for receiving a trailer hitch and the polygonal slide beams are square. The majority of currently manufactured vehicles have square hollow hitch receivers. Additionally, one or more taillights may be installed within the step. Not only does this enhance safety by increasing the number of taillights, it also draws attention to the position of the step with respect to the hitch receiver.

DRAWINGS

These and other features, aspects, and advantages of the present invention will become better understood with regard to the following description, appended claims, and accompanying drawings where:

DESCRIPTION

Figure 1:
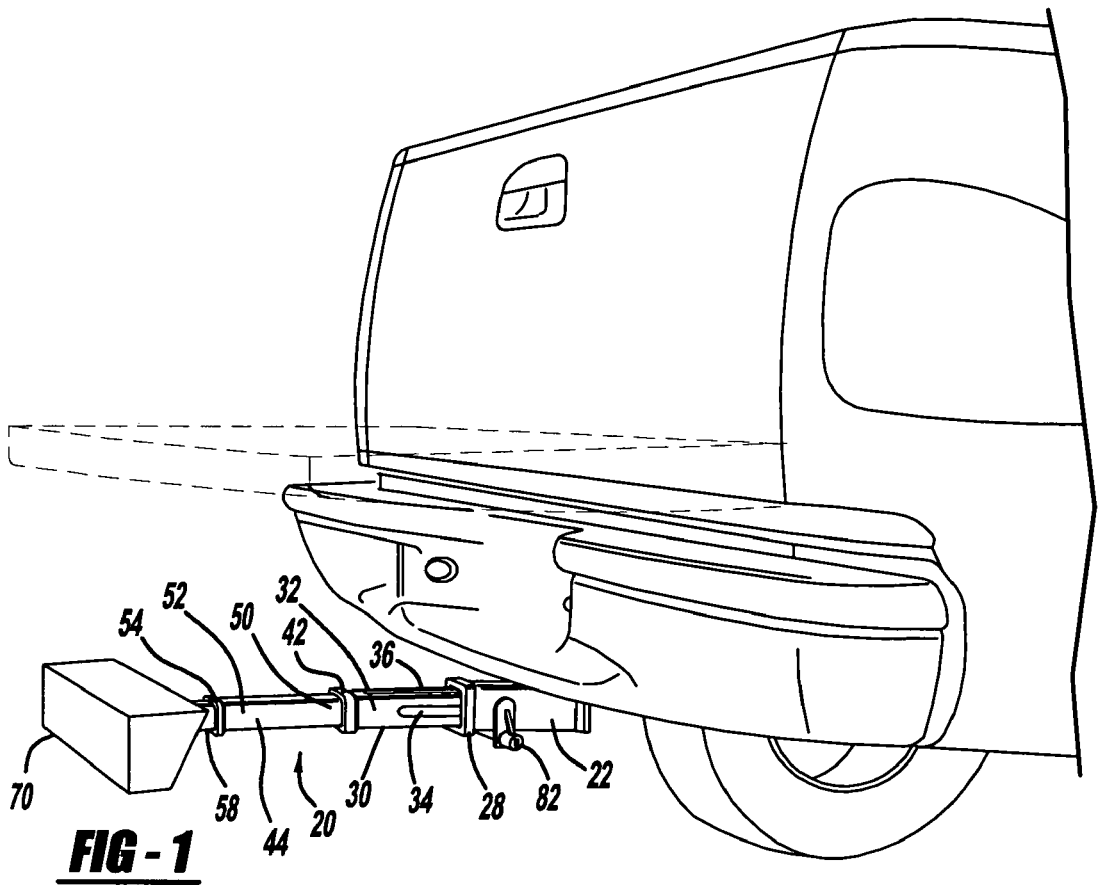
FIG. 1 is a perspective view of a telescoping vehicle step in an extended configuration.

The preferred embodiment of a telescoping vehicle step 20 is comprised of a hollow polygonal first slide beam 30, a hollow polygonal second slide beam 44, a first limit pin 56, a polygonal third slide beam 58, a second limit pin 68 and a step 70. The telescoping vehicle step 20 is intended to be inserted into a hitch receiver 22 attached to a vehicle. Hitch receivers 22 attached to vehicles are attached substantially parallel to the longitudinal axis of the vehicle. The hitch receiver 22 has a polygonal opening 24 for receiving a trailer hitch. Most often the polygonal opening 24 of the hitch receiver 22 is square. The hitch receiver 22 also has a pair of aligned openings 26 for receiving the locking cylinder of a hitch lock 82, 88. During typical use the locking cylinder of a hitch lock 88 is inserted through the pair of aligned openings 26 of the hitch receiver 22 as well as a pair of aligned openings formed within a trailer hitch, thereby securing the trailer hitch to the hitch receiver 22.

The preferred material from which the first slide beam 30 is fabricated is 11 gauge two inch square steel tube. The first slide beam 30 has a beam receiving end 32. The first slide beam 30 has a longitudinally aligned slot 36 on its upper horizontal face. Directional references with respect to the slide beams 30, 44, 58 refer to the directions resulting after the slide beams 30, 44, 58 are inserted into the hitch receiver 22. The first slide beam 30 has a pair of longitudinally aligned channels 34 shaped and positioned along the two opposing side vertical faces of the first slide beam 30 such that the locking bosses 84 of a modified hitch lock 82 inserted into the aligned openings 24 of the hitch receiver 22 protrude into the channels 34. This will limit the slide displacement of the first slide beam 30 within the hitch receiver 22 and will secure the first slide beam 30 to the hitch receiver 22. Ideally, the channels 34 are constructed by milling to a depth of ½ of the beam 30 thickness. This will retain the structural integrity of the first slide beam 30 during use, while providing for the full functionality of the channels 34. The hollow polygonal first slide beam 30 is shaped and sized to slide within, but not rotate within, the hitch receiver 22.

Figure 9:
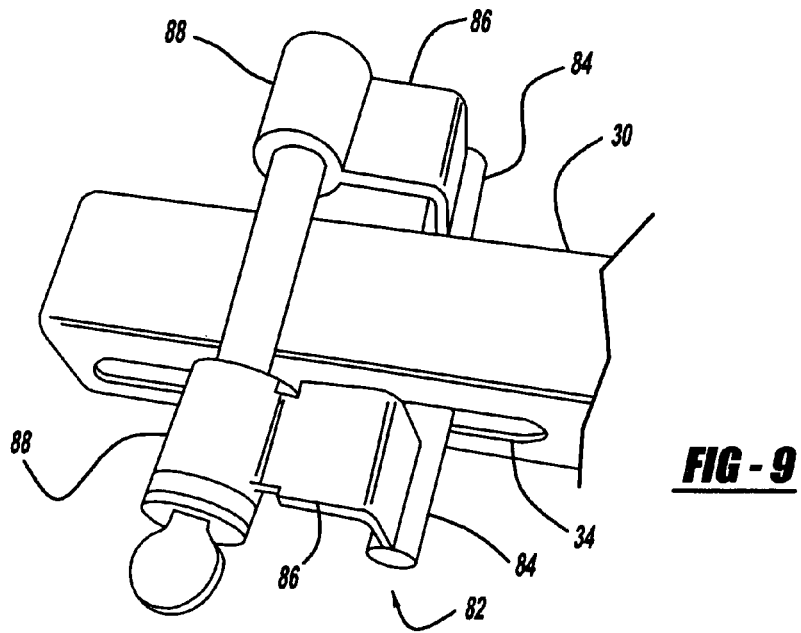
FIG. 9 is a bottom view of the first slide beam shown in FIG. 1 showing locking bosses of a hitch lock protruding into channels milled into the first slide beam.
Figure 10:
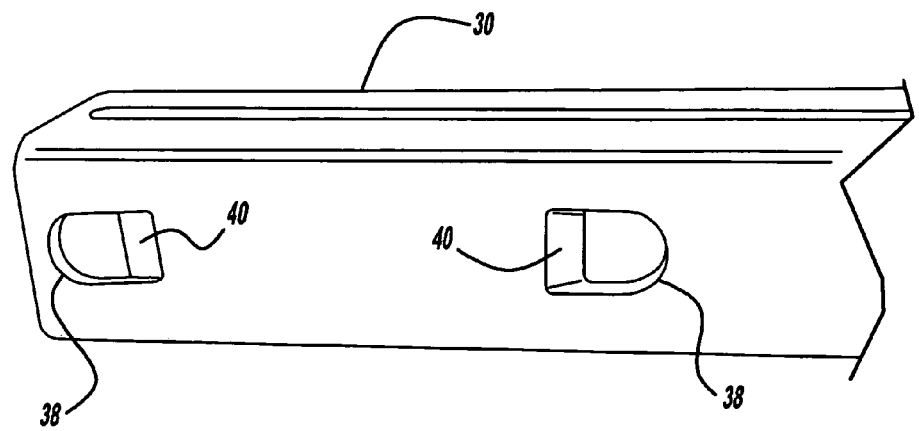
FIG. 10 is a side elevation view of an alternate embodiment of the first slide beam shown in FIG. 1 showing a pair of aligned openings on a face of the first slide beam, wherein the pair of aligned openings have chamfered facing edges.
Figure 11:
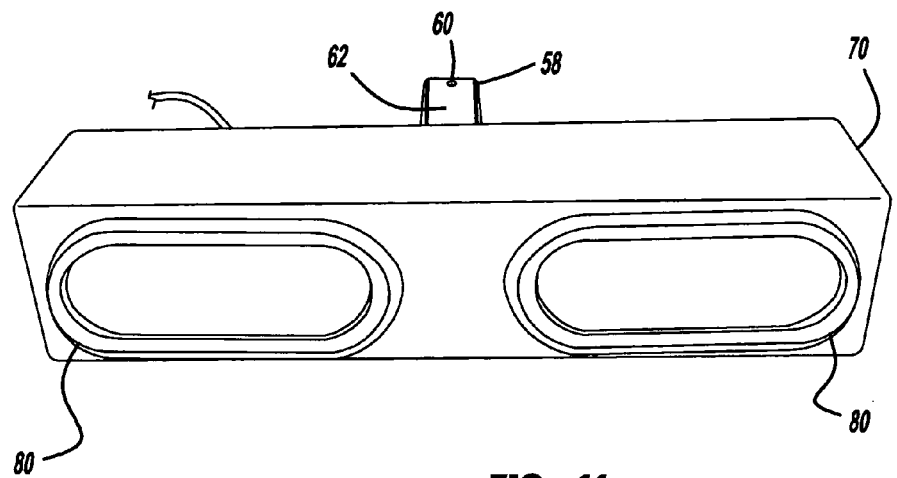
FIG. 11 is a rear elevation view of the step of the telescoping vehicle step of FIG. 2 showing vehicle taillights attached to the step.

A standard commonly available hitch lock modified for use with the telescoping vehicle step 20 is shown within FIG. 9. The modified hitch lock 82 is comprised of a standard hitch lock 88, a pair of brackets 86 and a pair of locking bosses 84. The standard hitch lock 88 is a keyed cylindrical device which separates into two parts. If the brackets 86 and locking bosses 84 are removed from the modified hitch lock 82 shown in FIG. 9, the standard hitch lock remains. The narrowed cylindrical portion of the standard hitch lock is designed to pass through the aligned openings 26 of a hitch receiver as well as the aligned openings of a trailer hitch. When the two parts of the standard hitch lock are locked together, the trailer hitch is secured to the hitch receiver.

In both embodiments of the first slide beam 30 described herein a standard hitch lock 88 cannot be used to secure the first slide beam 30 to the hitch receiver 22. This is because the standard hitch lock 88 cannot pass through the channels 34 of the first embodiment of the first slide beam 30 and the first slide beam 30 will not be capable of sliding within the hitch receiver 22 with respect to the second embodiment of the first slide beam 30 when the hitch lock is passed through the aligned openings 26 of the hitch receiver 22 and the aligned openings 38 of the first slide beam 30. To overcome this problem a standard hitch lock is modified as shown in FIG. 9. A pair of brackets 86, each attached to a boss 84, are attached to a standard two-piece hitch lock 88 such that the bosses 84 will pass through the aligned openings 26 of the hitch receiver 22 and protrude into the channels 34 of the first slide beam 30 to slidingly retain the first slide beam 30 within the hitch receiver 22. The standard hitch lock 88 of the modified hitch lock 82 is positioned below the first slide beam 30 during use, rather than passing through the first slide beam 30.

Alternatively, in lieu of the channels 34 and hitch lock 82, the means for limiting the slide displacement of the first slide beam 30 within the hitch receiver 22 may be comprised of a pair of aligned openings 38 within the first slide beam 30 and a spring-loaded pair of aligned locking bosses 90. The term a pair of aligned openings 38 within the first slide beam 30 refers to a pair of aligned openings 38 positioned upon the same face of the first slide beam. Each of the openings 38 is sized, shaped and positioned upon the first slide beam 30 such that the opening 38 may be aligned with an opening 26 within the hitch receiver 22 when the first slide beam 30 is inserted into the hitch receiver 22. Each vertical face of the first slide beam 30 has two openings. The term vertical face of the first slide beam 30 refers to the vertically oriented faces of the first slide beam 30 when it is inserted into the hitch receiver 22. The openings 38 on the vertical face of the first slide beam 30 are sized, shaped and positioned such that an opening 38 upon each vertical face of the first slide beam 38 is simultaneously alignable with the openings 26 within the hitch receiver 22. Each pair of aligned openings 38 positioned within the same vertical face of the first slide beam 30 has chamfered facing edges 40. The first slide beam 30 is secured to the hitch receiver 22 with a spring-loaded pair of aligned locking bosses 90. The locking bosses 90 are sized, shaped and positioned upon a spring-loaded bracket 92 such that the locking bosses 90 will protrude through the openings 26 of the hitch receiver 22 and into an opening 38 within the first slide beam 38 on each vertical face of the first slide beam 30, thereby limiting movement of the first slide beam 30 along the longitudinal axis of the hitch receiver 22 in the direction of the other chamfered opening 38 upon the same vertical face of the first slide beam 30 and preventing movement of the first slide beam 30 along the longitudinal axis of the hitch receiver 22 in the direction opposite the chamfers 40. Thus, each pair of aligned openings 38 upon the same vertical face of the first slide beam 30 forms a two position detent with the spring-loaded pair of aligned locking bosses 90. The chamfered facing edges 40 should be chamfered at an angle of approximately 35 degrees. The spring-loaded bracket 92 should be formed from 1/32" spring steel as a 3 sided rectangle which snugly fits around the first slide beam 30.

The hollow polygonal second slide beam 44 has a longitudinally aligned slot 46 on its upper horizontal face and a limit pin opening 48 positioned between that slot 46 and the insertion end 50 of the second slide beam 44. The limit pin opening 48 extends through two faces of the second slide beam 44. The insertion end 50 of the second slide beam 44 is intended to be inserted into the beam receiving end 32 of the first slide beam 30. The other end of the second slide beam 44 is the receiving end 52. The receiving end 52 is intended to receive the insertion and 62 of the third slide beam 58. The hollow polygonal second slide beam 44 is shaped and sized to slide within, but not rotate within, the first slide beam 30. Preferably, it is fabricated from 11 gauge 1¾ inch square steel. The insertion end 50 of the second slide beam 44 is inserted into the receiving end 32 of the first slide beam 30 such that the slots 36, 46 of the first slide beam 30 and of the second slide beam 44 overlap and a such that the end of the second slide beam 44 having the limit pin opening 48 is inserted into the first slide beam 30.

The first limit pin 56 is inserted through the slot 36 of the first slide beam 30 and the limit pin opening 48 of the second slide beam 44. This will prevent the second slide beam 44 from being withdrawn from the first slide beam 30, while permitting the second slide beam 44 to slide within the first slide beam 30. The first limit pin 56 must have sufficient length to protrude from the limit pin opening 48 of the second slide beam 44 when the first limit pin 56 is inserted into the limit pin opening 48 of the second slide beam 44.

The polygonal third slide beam 58 has an insertion end 62 and a receiving end 64. The insertion end 62 of the third slide beam 58 is intended to be inserted into the receiving end 52 of the second slide beam 44. The third slide beam 58 has a limit pin opening 60 on its upper horizontal face and its lower horizontal face. The limit pin opening 60 is positioned proximal to the insertion end 62 of the third slide beam 58. The limit pin opening 60 extends through two faces of the third slide beam 58. The polygonal third slide beam 58 is shaped and sized to slide within, but not rotate within, the second slide beam 44. The third slide beam 58 is inserted into the receiving end 52 of the second slide beam 44 such that the end of the third slide beam 58 having the limit pin opening 60 is inserted into the receiving end 52 of the second slide beam 44 and such that the slot 46 of the second slide beam 44 overlap's the limit pin opening 60 of the third slide beam 58. Preferably, the third slide beam 58 is fabricated from 11 gauge 1½ inch square steel.

The second limit pin 68 is inserted through the slot 46 of the second slide beam 44 and the limit pin opening 60 of the third slide beam 58. This will prevent the third slide beam 58 from being withdrawn from the second slide beam 44, while allowing the third slide beam 58 to slide within the second slide beam 44. The second limit pin 44 must have sufficient length to protrude from the limit pin opening 60 of the third slide beam 58 when the second limit pin 68 is inserted into the limit pin opening 60 of the third slide beam 58.

The step 70 is attached to the receiving end 64 of the third slide beam 58. This should be accomplished by welding. The step 70 should have a vertical face and a horizontal face. The horizontal face is aligned such that it provides a step with a surface parallel to the surface of a lowered tailgate on the vehicle. The step 70 should be fabricated from steel.

Figure 8:
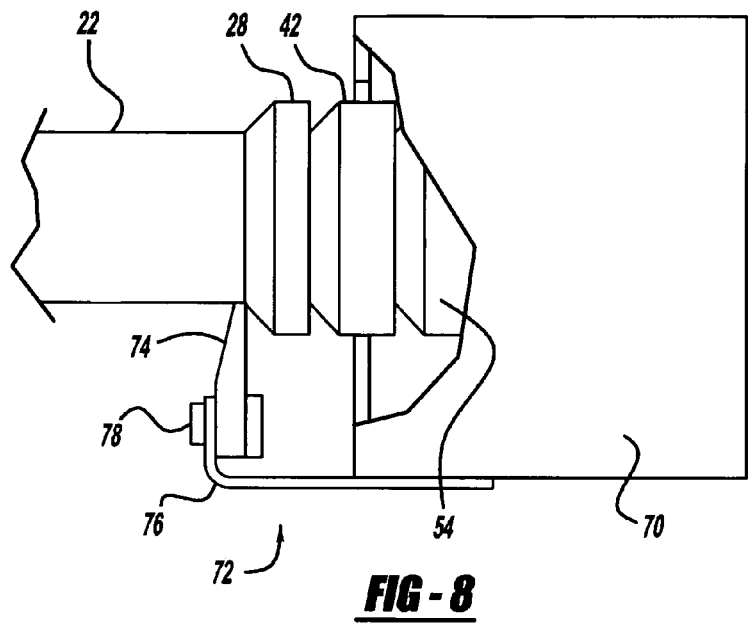
FIG. 8 is a side elevation view of the collapsed telescoping vehicle step of FIG. 2 showing a step lock securing the telescoping vehicle step to the hitch receiver.

Preferably, the receiving end of each beam 30, 44, 58 and the receiving end of the hitch receiver 22 have reinforcing collars 42, 54, 28. This strengthens the telescoping beam assembly and reduces the possibility of deformation of the beams. Additionally, a reinforcing collar 28 upon the receiving end of the hitch receiver 22 provides a base to which a step lock 72 may be secured. A step lock 72 is desirable in order to prevent the telescoping vehicle step 20 from extending and telescoping when it is not being used. The step lock 72 is attached to the assembly of the step 70 and its attached slide beam 58. Preferably, it is comprised of a bracket 76 and a lock flap 74. The lock flap 74 is fabricated from a stiff elastic material such as plastic. The bracket 76 is sized, shaped and positioned such that the lock flap 74 will prevent undesired telescoping or extension of the device by creating a physical stop with the reinforcing collar on the hitch receiver, as shown in FIG. 8. The lock flap 74 may be secured to the bracket 76 by one or more bolts 78.

One or more taillights 80 may be installed within the step 70. Not only does this enhance safety by increasing the number of taillights on the vehicle, it also draws attention to the position of the step with respect to the hitch receiver.

Before using the telescoping vehicle step 20, it is installed on the vehicle. This is accomplished by inserting the receiving end of the first slide beam 30 into the hitch receiver 22. At this time the slot 36 of the first slide beam 30 is on the uppermost face of the first slide beam 30 and the channels 34 of the first slide beam 30 are aligned with the aligned openings 26 of the hitch receiver 22. The bosses 84 of the hitch lock 82 are passed through the aligned openings 26 of the hitch receiver 22 and caused to protrude into the channels 34 of the first slide beam 30. The hitch lock 82 is then locked with its locking cylinder positioned below the first slide beam 30 and the hitch receiver 22.

Figure 2:
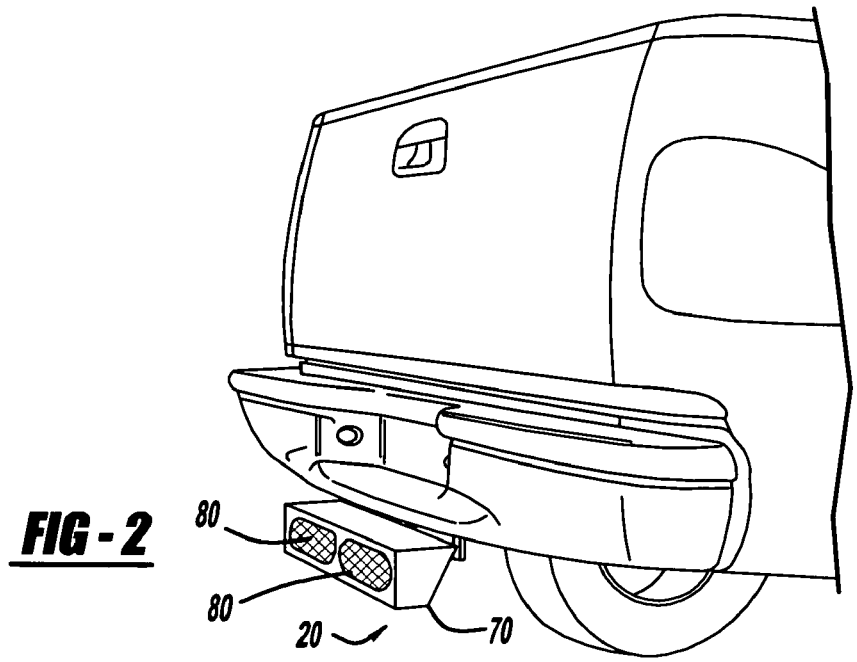
FIG. 2 is a perspective view of the telescoping vehicle step of FIG. 1 in a collapsed configuration.
Figure 3:
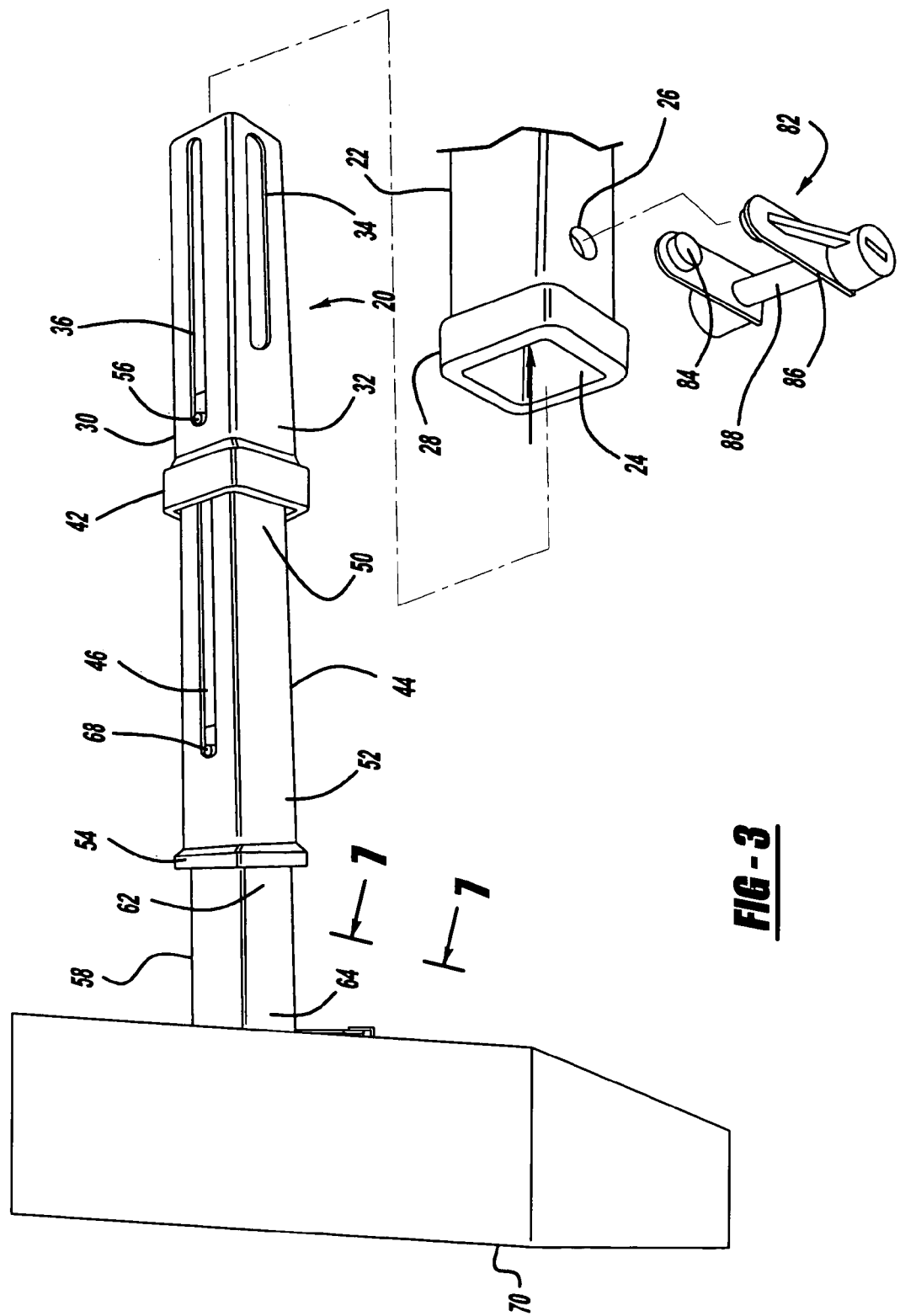
FIG. 3 is a perspective view of the telescoping vehicle step of FIG. 1 with a hitch receiver and a step lock broken away.
Figure 4:
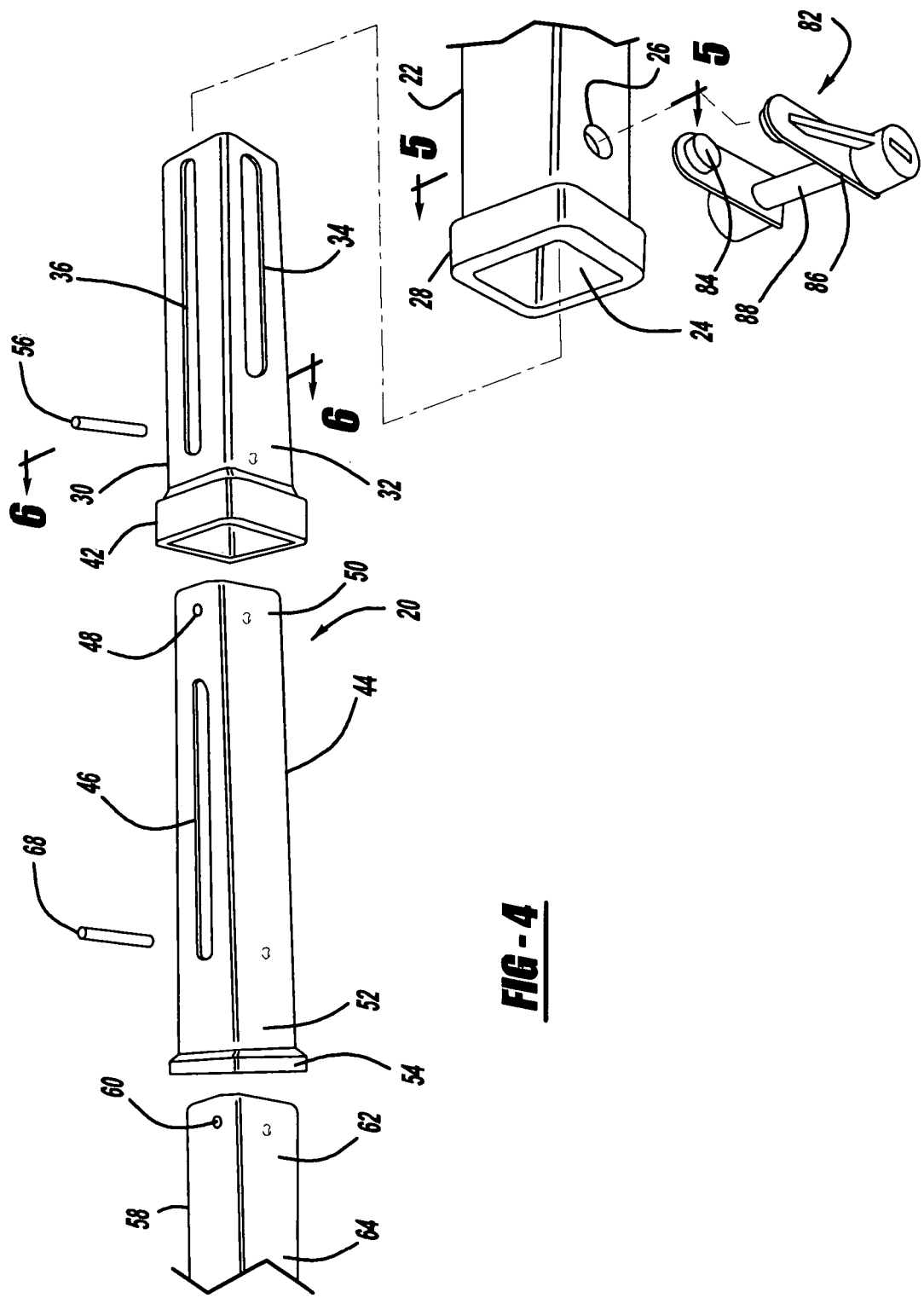
FIG. 4 is a perspective view of the telescoping vehicle step of FIG. 3 with slide beams and limit pins broken away.
Figure 5:
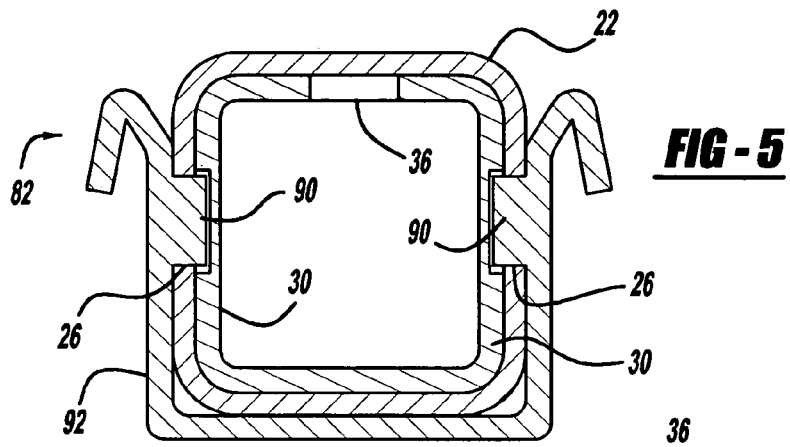
FIG. 5 is a sectional view of the first slide beam and the hitch receiver shown in FIG. 4, wherein the slide beam is secured to the hitch receiver by a spring-loaded pair of aligned locking bosses.
Figure 6:
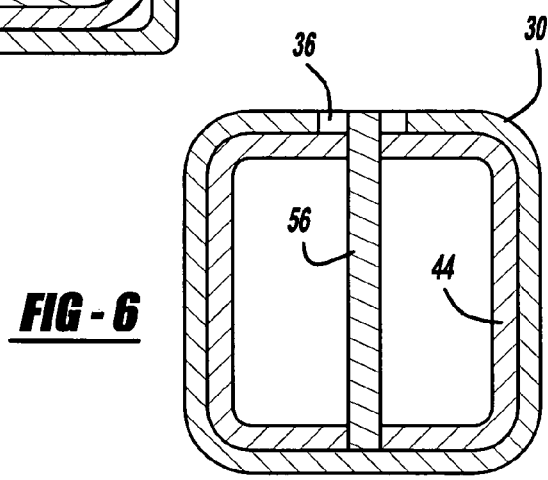
FIG. 6 is a sectional view of the first slide beam and the second slide beam shown in FIG. 4, further showing a slot within the first slide beam and a first limit pin.
Figure 7:
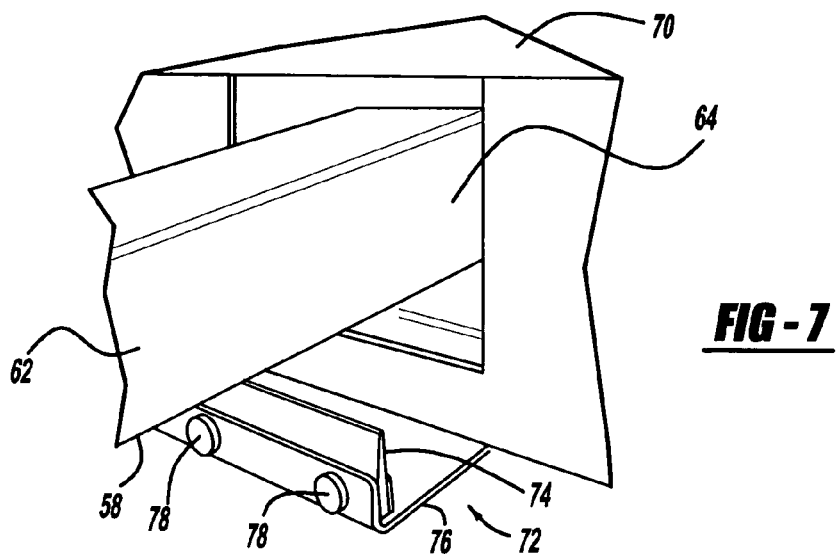
FIG. 7 is a perspective view of the telescoping vehicle step of FIG. 1 showing the step, a third slide beam and a step lock attached to the step.
Figure 12:
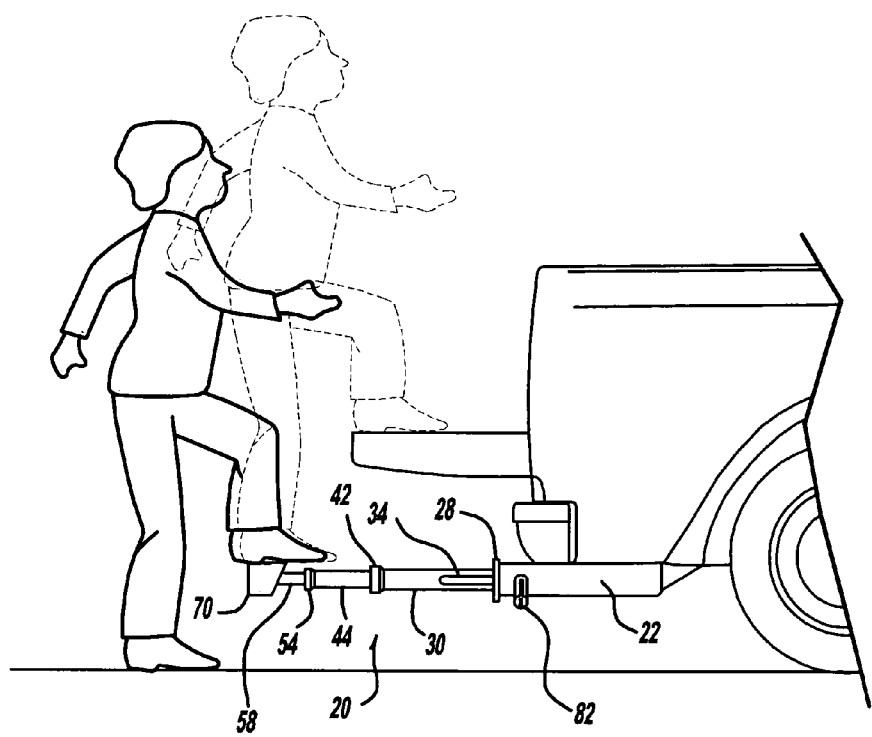
FIG. 12 is a perspective view of the telescoping vehicle step of FIG. 1 showing a method of using the telescoping vehicle step.

In order to use the telescoping vehicle step 20 it is manually pulled away from the hitch receiver 22 with a sufficient degree of force to unlock the lock flap 74 of the step lock 72 from the reinforcing collar 28 of the hitch receiver 22. The vehicle step 70 is pulled away from the vehicle until each of the slide beams 30, 44, 58 are extended to the end of their travel, thus forming a telescoped vehicle step, as shown in FIG. 12. The tailgate of the vehicle is lowered. The user steps onto the step 70, onto the lowered tailgate and then into the cargo bed of the vehicle, as shown, in part, in FIG. 12. The user performs desired activities, such as adjusting the cargo positioning, and then exits the cargo bed by stepping onto the tailgate and then onto the step 70 of the telescoping vehicle step 20. The tailgate is closed. The step 70 of the telescoping vehicle step 20 is pushed toward the hitch receiver 22 into a collapsed configuration, as shown in FIG. 2. Sufficient force is used to cause the lock flap 74 of the step lock 72 to pass over the reinforcing collar 28 of the hitch receiver 22, thereby securing the telescoping vehicle step 20 to the vehicle in a collapsed configuration.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A telescoping vehicle step for insertion into a hitch receiver, said hitch receiver being attached substantially parallel to the longitudinal axis of a vehicle and said hitch receiver having a polygonal opening for receiving a trailer hitch and a pair of aligned openings for receiving the locking cylinder of a hitch lock, said telescoping vehicle step comprising:

(a) a hollow polygonal first slide beam having a longitudinally aligned slot on one of its faces and a pair of longitudinally aligned channels shaped and positioned along two other opposing faces of said first slide beam such that the locking bosses of a hitch lock inserted into the aligned openings of the hitch receiver protrude into the channels for limiting the slide displacement of the first slide beam within the hitch receiver, said hollow polygonal first slide beam being shaped and sized to slide within, but not rotate within, the hitch receiver;

(b) a hollow polygonal second slide beam having a longitudinally aligned slot on one of its faces and a limit pin opening positioned between said slot and an end of said second slide beam, said hollow polygonal second slide beam being shaped and sized to slide within, but not rotate within, the first slide beam, said second slide beam being inserted into the first slide beam such that the slots of the first slide beam and of the second slide beam overlap and such that the end of the second slide beam having the limit pin opening is inserted into the first slide beam;

(c) a first limit pin inserted through the slot of the first slide beam and the limit pin opening of the second slide beam for preventing the second slide beam from being withdrawn from the first slide beam, said first limit pin having sufficient length to protrude from the limit pin opening of the second slide beam when the first limit pin is inserted into the limit pin opening of the second slide beam;

(d) a polygonal third slide beam having a limit pin opening on one of its faces proximal to an end of said third slide beam, said polygonal third slide beam being shaped and sized to slide within, but not rotate within, the second slide beam, said third slide beam being inserted into the second slide beam such that the end of the third slide beam having the limit pin opening is inserted into the second slide beam and such that the slot of the second slide beam overlaps the limit pin opening of the third slide beam;

(e) a second limit pin inserted through the slot of the second slide beam and the limit pin opening of the third slide beam for preventing the third slide beam from being withdrawn from the second slide beam, said second limit pin having sufficient length to protrude from the limit pin opening of the third slide beam when the second limit pin is inserted into the limit pin opening of the third slide beam; and (f) a step attached to the third slide beam.

2. The telescoping vehicle step of claim 1, further comprising a step lock attached to the assembly of the step and its attached slide beam for retaining the step and slide beams in a collapsed configuration.

3. The telescoping vehicle step of claim 1, further comprising a hitch lock having two aligned spaced apart locking bosses wherein the locking bosses protrude through the aligned openings of the hitch receiver and into the aligned channels of the first slide beam to slidingly retain the first slide beam within the hitch receiver, said channels having a depth which is less than the thickness of the first slide beam.

4. The telescoping vehicle step of claim 1, wherein the polygonal opening for receiving a trailer hitch and the polygonal slide beams are square.

5. The telescoping vehicle step of claim 1, further comprising a reinforcing collar surrounding the receiving end of one or more of the beams.

6. The telescoping vehicle step of claim 1, further comprising one or more vehicle taillights attached to the step.

* * * * *